United States Patent

Gochenour et al.

(10) Patent No.: US 6,609,602 B2
(45) Date of Patent: Aug. 26, 2003

(54) FRICTION CLUTCH WITH INSTALLATION DEVICE

(75) Inventors: Daniel V. Gochenour, Auburn, IN (US); Martin E. Kummer, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/943,497

(22) Filed: Aug. 30, 2001

(65) Prior Publication Data

US 2003/0042108 A1 Mar. 6, 2003

(51) Int. Cl.[7] .................................................. F16D 3/14
(52) U.S. Cl. ............................. 192/105 C; 192/105 CP; 192/109 R; 192/93 R
(58) Field of Search ...................... 192/105 C, 105 CP, 192/109 R, 29, 464, 93 R, 30 R, 83

(56) References Cited

U.S. PATENT DOCUMENTS

| | | | | | |
|---|---|---|---|---|---|
| 2,216,771 A | * | 10/1940 | Evans | ..................... | 192/105 C |
| 2,218,379 A | * | 10/1940 | Evans | ..................... | 192/105 C |
| 2,224,440 A | * | 12/1940 | Lewis | ..................... | 192/105 C |
| 2,447,007 A | * | 8/1948 | Gravina et al. | ......... | 192/105 C |
| 2,800,208 A | * | 7/1957 | Binder | .................. | 192/105 C |
| 2,850,131 A | * | 9/1958 | Maurice et al. | ......... | 192/105 R |
| 2,987,155 A | * | 6/1961 | Maurice et al | .......... | 192/105 C |
| 3,091,315 A | * | 5/1963 | Maurice et al. | ......... | 192/105 C |
| 3,580,372 A | * | 5/1971 | Schiefer et al. | ......... | 192/105 C |
| 4,754,665 A | | 7/1988 | Vandervoort | ................. | 74/745 |
| 5,370,013 A | | 12/1994 | Reynolds et al. | ............. | 74/330 |
| 5,974,354 A | | 10/1999 | Janecke et al. | ............... | 701/64 |
| 5,974,906 A | | 11/1999 | Stine et al. | .................... | 74/335 |
| 6,015,366 A | | 1/2000 | Markyvech et al. | ........ | 477/109 |

\* cited by examiner

*Primary Examiner*—Charles A. Marmor
*Assistant Examiner*—Eric M. Williams
(74) *Attorney, Agent, or Firm*—Rader, Fishman & Grauer PLLC

(57) ABSTRACT

A centrifugal master friction clutch having an installation device is provided that includes a cover assembly fixed for rotation with an engine flywheel and at least one friction plate fixed for rotation with a transmission input shaft. The cover assembly includes a pressure plate for applying a clamping force against the friction plate and a plurality of flyweights that rotate outward under the effects of centrifugal force to cause the pressure plate to exert a clamping force against the friction plate. The clutch installation device includes a first member rotatably disposed in the cover assembly radially inward of the flyweights. A portion of the first member is configured to engage at least one of the flyweights to force the engaged flyweight to rotate outward. A second member is included for engagably limiting the degree of rotation of the first member. A method of installing a centrifugal clutch is also described.

28 Claims, 16 Drawing Sheets

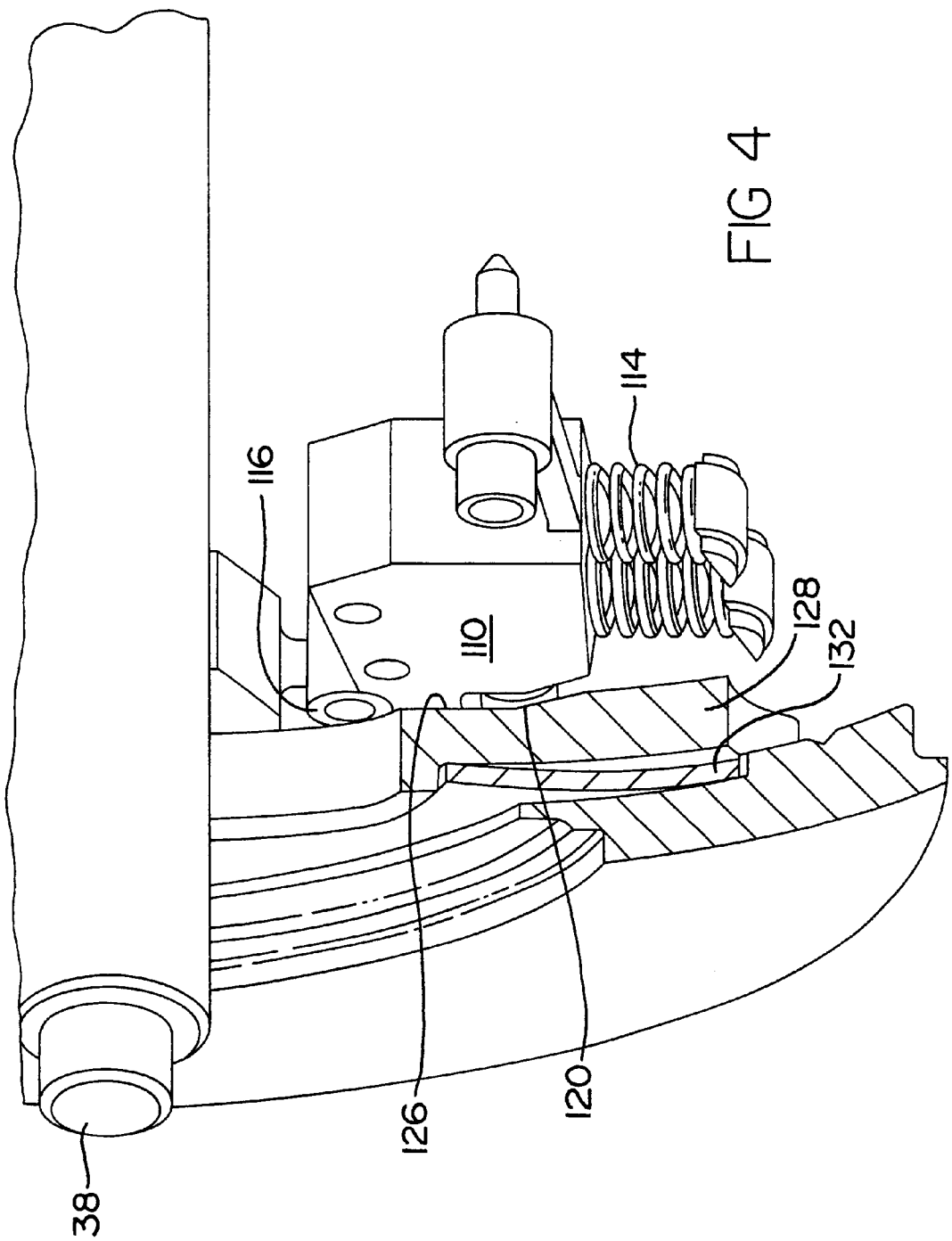

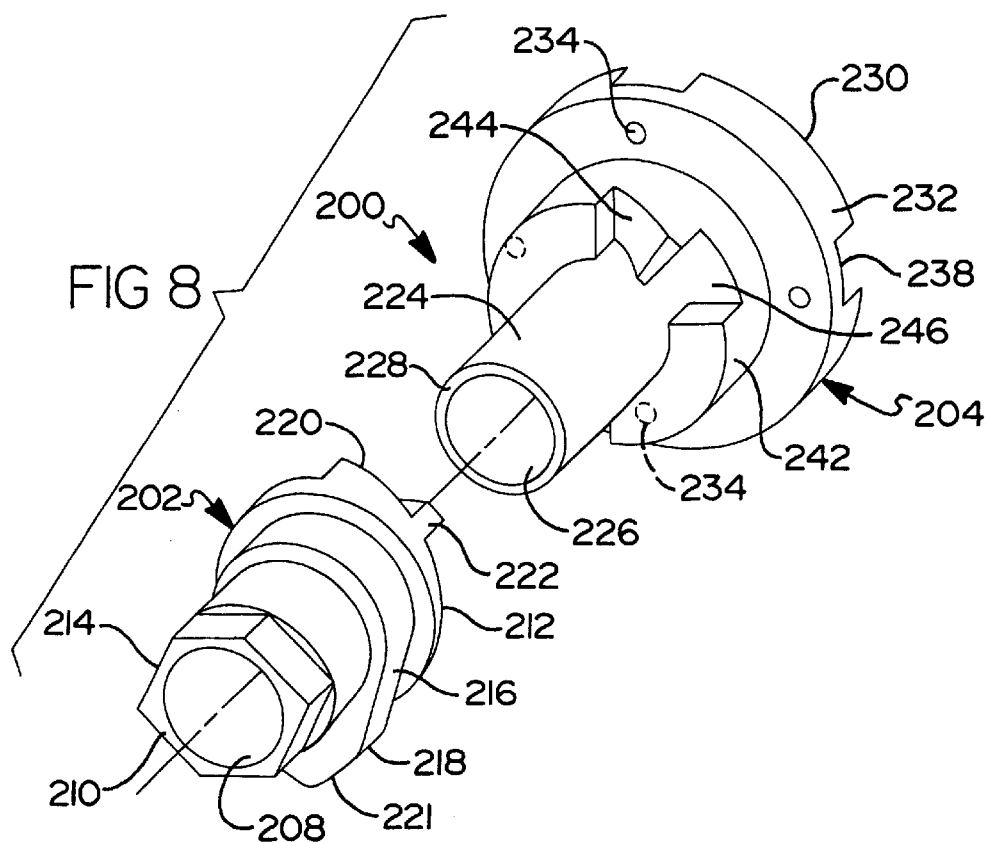
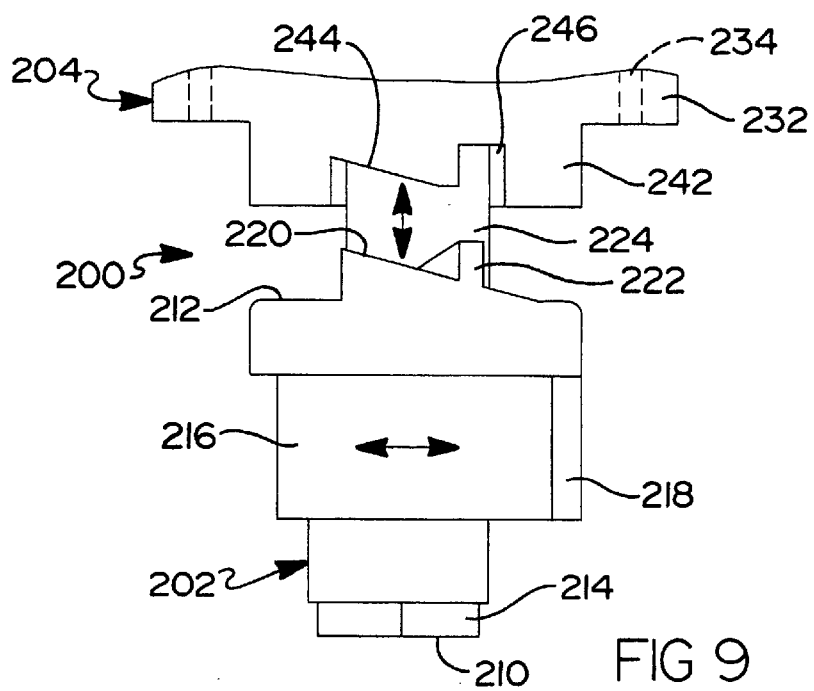

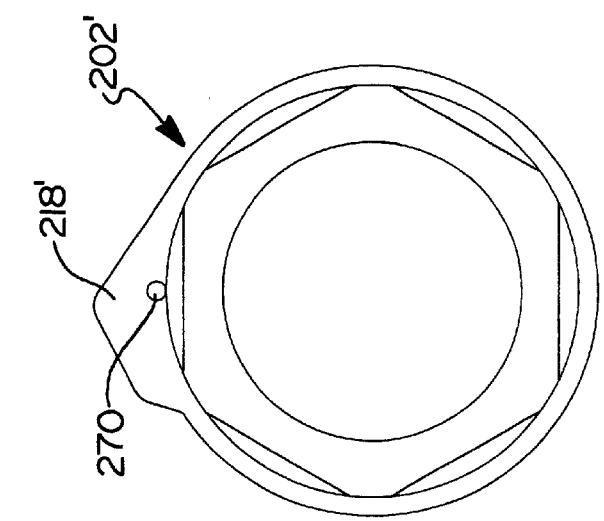
FIG IIC
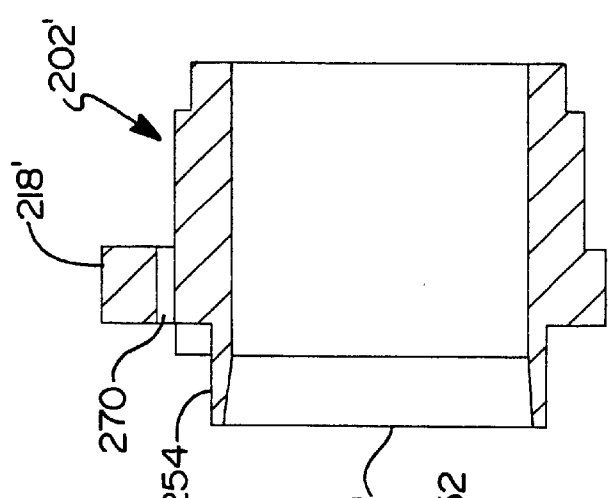
FIG IIB
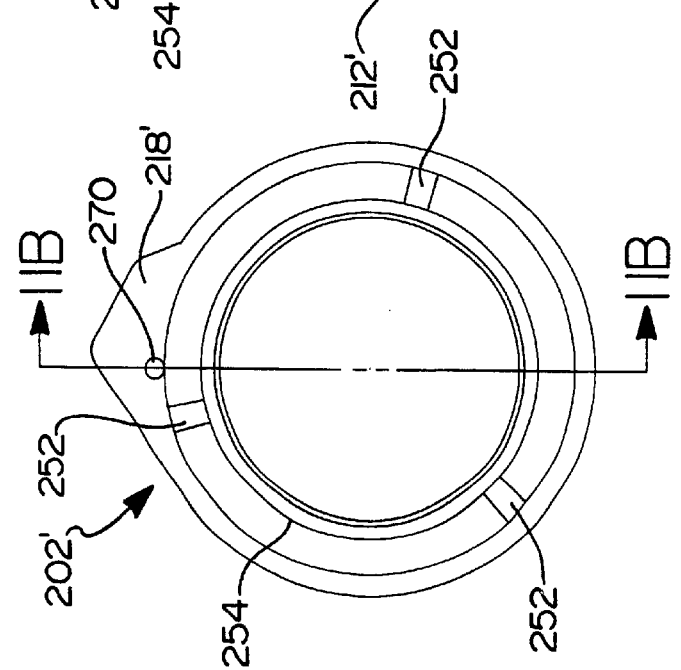
FIG IIA

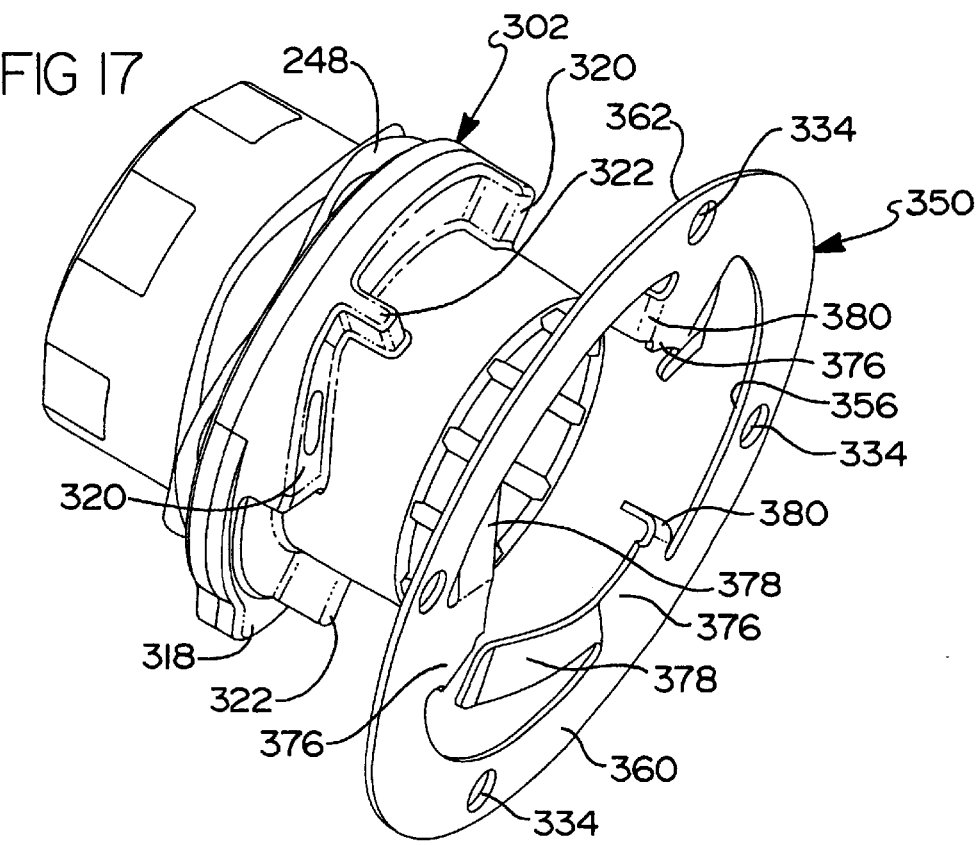

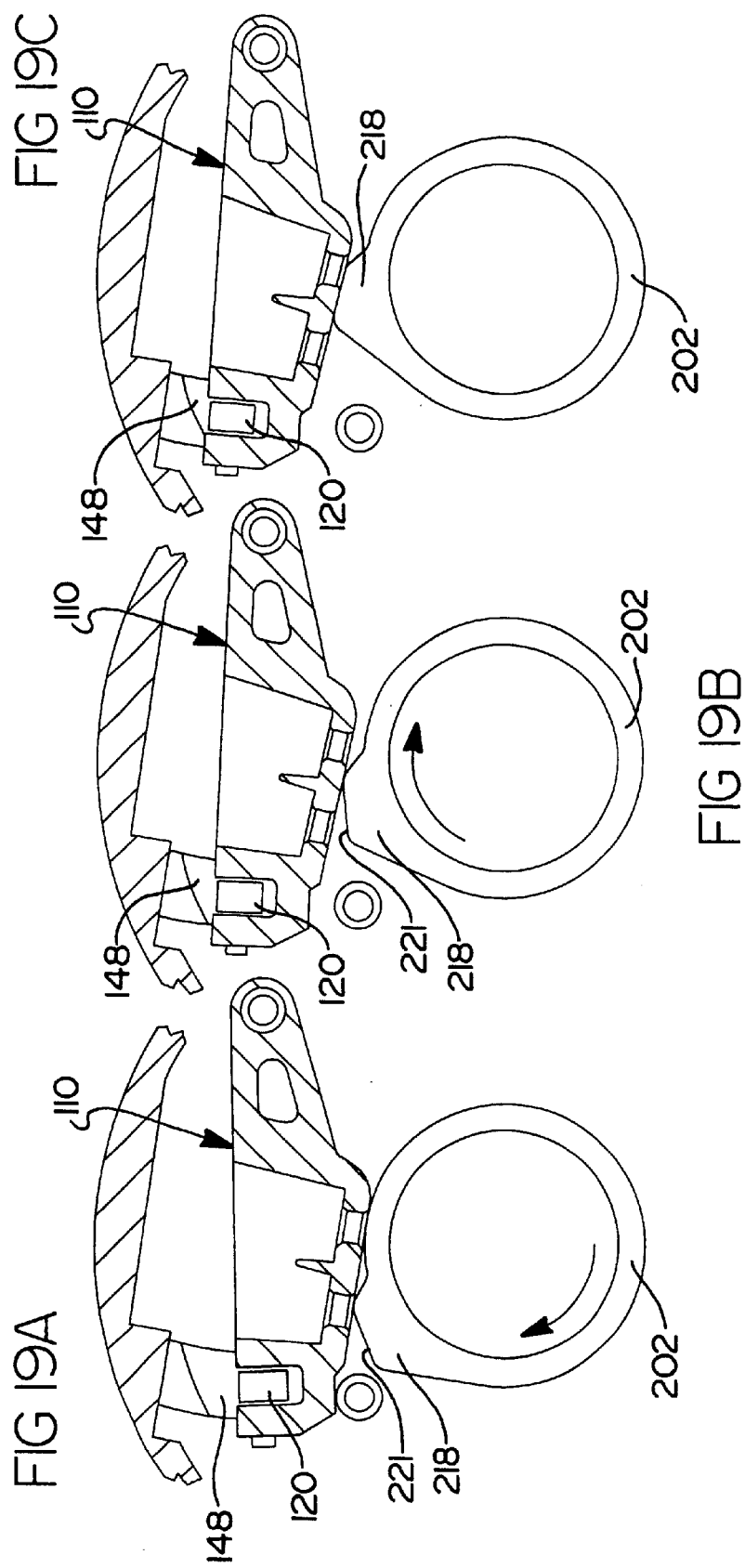

FRICTION CLUTCH WITH INSTALLATION DEVICE

FIELD OF THE INVENTION

The present invention relates generally to a vehicle drive-train system utilizing a master friction clutch and, in particular, to a centrifugal master friction clutch including a means for installing the clutch in the drive-train system.

BACKGROUND OF THE INVENTION

Vehicle drive-train systems that comprise an internal combustion engine, a master friction clutch and a transmission are known in the art. Typical master friction clutch assemblies generally include a cover assembly comprising a pressure plate, a cover and a diaphragm spring, all coupled for rotation together with an engine flywheel. More precisely, a typical master friction clutch also includes at least one friction plate, commonly called a driven disc, having at its outer periphery friction pads and at its inner periphery a hub that is mounted on a driven member, such as a transmission input shaft. When the clutch is disengaged, the pressure plate is axially removed from the friction plate and no torque is transferred between the engine flywheel and the friction plate. When the clutch is engaged, the pressure plate supplies a clamping force against the friction plate causing the engine flywheel and friction plate to contact and transfer torque therebetween.

Common state of the art vehicle master friction clutch assemblies are normally closed (engaged) systems that generally include a release member, such as a bearing mechanism, to selectively disengage the clutch under direction of the vehicle operator. A procedure for installing normally closed clutch systems in a vehicle drive-train system typically includes: (i) installing the friction plate(s) on a temporary installation shaft; (ii) securing the clutch cover assembly to the flywheel to clamp the friction plate(s) between the flywheel and a pressure plate; and (iii) removing the installation shaft to permit insertion of a transmission input shaft. The friction plate(s) are held in position after removal of the installation shaft by the clamping force of the pressure plate until the transmission can be installed into the vehicle drive-train system.

Normally open (disengaged) vehicle master friction clutch systems, such as centrifugally operated friction clutches, are also well known in the art. Centrifugally operated friction clutches generally include an input member driven by an internal combustion engine and weights pivotable with respect to the input member which, upon rotation of the input member, will rotate or pivot radially outwardly under the effect of centrifugal force to cause the input member to frictionally engage an output member. An example of a centrifugally operated friction clutch may be seen by reference to pending U.S. patent applications Ser. Nos. 09/813,494; 09/813,919; and 09/814,494, filed Mar. 21, 2001, which are owned by the assignee of the present invention and are hereby incorporated by reference in their entirety.

Unlike a normally closed (engaged) master friction clutch system, the pressure plate in a normally open (disengaged) master friction clutch system does not exert a clamping force on the friction plate(s) until the clutch is engaged. Accordingly, securing the clutch cover assembly of a normally open master friction clutch system to the engine flywheel does not clamp the friction plate(s) between the flywheel and the pressure plate. The inability to adequately secure the friction plate(s) after removal of the installation shaft renders a conventional normally open clutch system difficult to install in a vehicle drive-train system.

SUMMARY OF THE INVENTION

In accordance with an embodiment of the present invention, a normally open, centrifugal master friction clutch is provided, which includes a device that facilitates installation of the master friction clutch into a vehicle drive-train system. In a preferred embodiment, the master friction clutch includes an input portion fixed for rotation with an engine flywheel and an output portion fixed for rotation with a transmission input shaft. The output portion comprises at least one friction plate secured to the transmission input shaft for rotation therewith. The input portion includes a cover assembly secured to the engine flywheel for rotation therewith. The cover assembly comprises a pressure plate for applying a clamping force against the friction plate(s), a plurality of flyweights that pivot outward under the effects of centrifugal force to cause the pressure plate to exert a clamping force against the friction plate(s), and a clutch installation device.

The clutch installation device comprises a first member rotatably disposed in the cover assembly radially inwardly of the flyweights and a second member adjacent the first member for engagably limiting the degree of rotation of the first member. The first member of the inventive clutch installation device includes at least one cam lobe for engaging at least one of the flyweights during rotation of the first member relative to the second member. The rotating cam lobe forces the engaged flyweight to rotate outward to modify the position of the pressure plate, such that, when the cover assembly is secured to the engine flywheel, the pressure plate provides a clamping force against the friction plate to prevent movement thereof.

In a preferred embodiment, the first member is slidably disposed on a shaft-like structure of the second member. The first member further includes a first inclined cam surface against which a second inclined cam surface of the second member acts to convert rotative movement of the first member relative to the second member into axial movement. The second member further includes a slot proximate the second cam surface that is configured to receive a lug on the first member to limit the degree of rotation of the first member relative to the second member.

In a second embodiment, the second member is disposed on a land of the first member. An inner surface of the second member includes a plurality of slots that receive a plurality of corresponding tabs located on the first member. During rotation of the first member, each tab engages a surface of a corresponding slot to limit the degree of rotation of the first member relative to the second member.

In a third embodiment, the second member is disposed on a land of the first member. The first member includes a plurality of inclined cam surfaces against which corresponding cam members on the second member act to convert rotative movement of the first member relative to the second member into axial movement. The second member further includes a plurality of tabs that are each configured to engage a corresponding lug on the first member to limit the degree of rotation of the first member relative to the second member.

Among other advantages, the inventive clutch installation device simplifies installation of a normally open, centrifugal clutch system enabling a centrifugal master friction clutch to be easily installed into a vehicle drive-train system. The inventive clutch installation device prevents movement of clutch friction plate(s) during installation of a normally open, centrifugal master friction clutch into a vehicle drive-train system. The inventive clutch installation device provides a means of easily "unlocking" the device after installation of the clutch into the vehicular drive-train system. The inventive clutch installation device advantageously blocks the ingress of contamination into the area surrounding the centrifugal flyweights to promote reliable operation of the centrifugal components of the clutch.

Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

FIG. 4 is a partial sectional view of a roller, ramp, and clamp force limiting spring member adjacent the centrifugal components of the clutch.

FIG. 8 is an exploded perspective view of the installation cam and baffle member according to the preferred embodiment.

FIG. 9 is a plan view of the installation cam and baffle member.

FIGS. 11A, 11B and 11C are an elevational view of a second end, a cross-sectional view, and an elevational view of a first end, respectively, of an installation cam according to the second embodiment.

FIG. 17 is an exploded perspective view of the installation cam and plate member according to the third embodiment.

FIG. 18 is an elevational view of the installation cam relative to the plate member according to the third embodiment.

FIG. 19 is an illustration of various positions of the installation cam relative to a centrifugal flyweight during rotation of the installation cam.

DESCRIPTION OF THE PREFERRED EMBODIMENT

Figure 1:
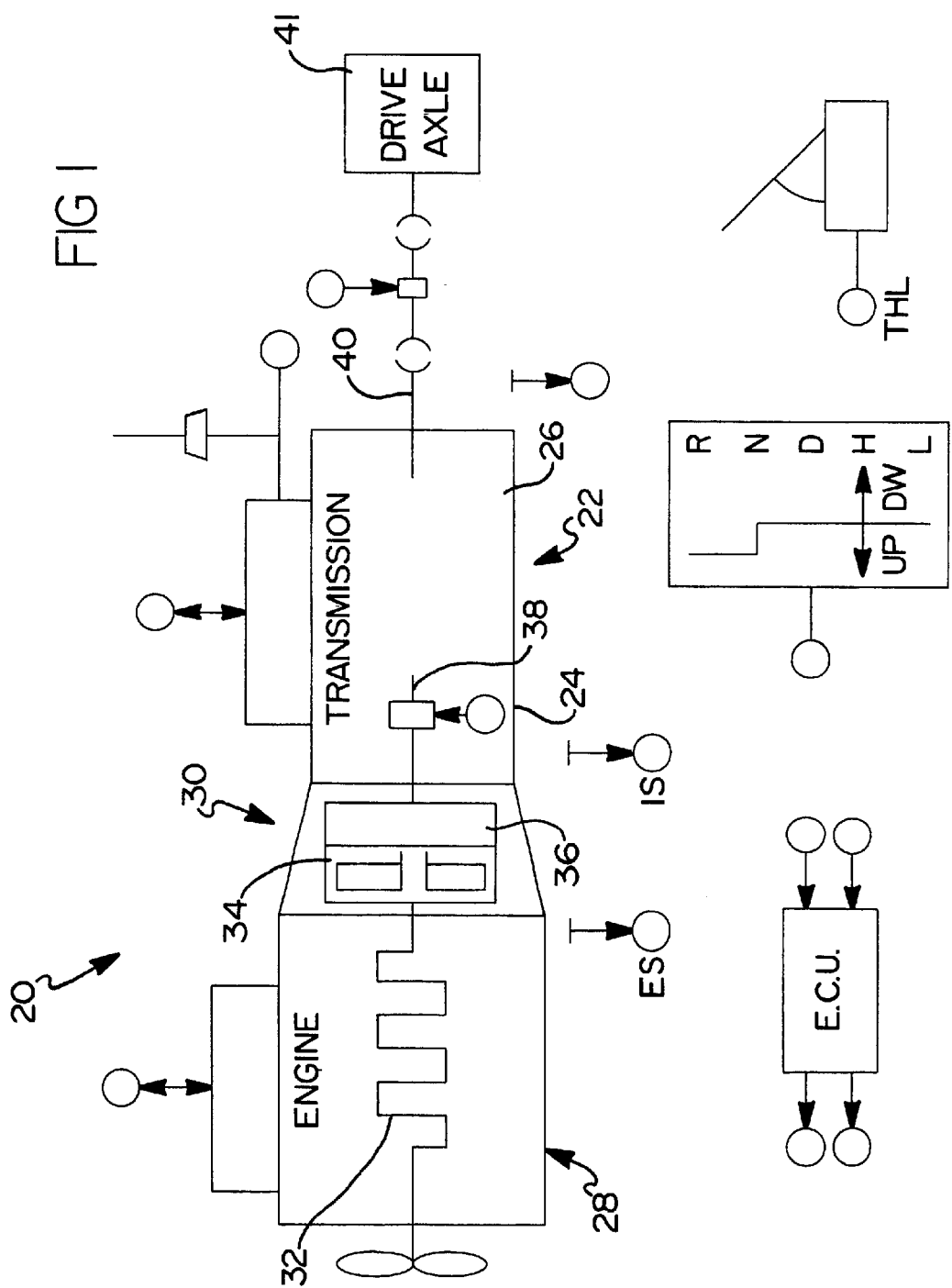
FIG. 1 is a schematic illustration of a vehicular drive-train system utilizing the centrifugal clutch of the present invention.

Referring now to the drawings, the preferred embodiments of the present invention are described in detail. An at least partially automated vehicle drive-train system 20 utilizing the centrifugally operated master friction clutch of the present invention is schematically illustrated in FIG. 1. System 20 may be fully automated, as seen by way of example in U.S. Pat. No. 4,361,060, partially automated, as seen by way of example in U.S. Pat. Nos. 4,648,290 and 5,409,432, or manual with controller assist, as seen by way of example in U.S. Pat. Nos. 4,850,236; 5,582,558; 5,735,771; and 6,015,366.

In system 20, a multi-gear transmission 22 comprising a main transmission section 24 connected in series with a splitter-type auxiliary transmission section 26 is drivingly connected to an internal combustion engine 28, such as a gasoline or diesel engine, by a centrifugal master friction clutch 30 of the present invention. Transmission 22, by way of example, may be of the type well known in the prior art and sold by the assignee of this application, EATON CORPORATION, under the trademarks "Super-10" and "Lightning", and may be seen in greater detail by reference to U.S. Pat. Nos. 4,754,665; 6,015,366; 5,370,013; 5,974,906; and 5,974,354, the disclosures of which are incorporated herein by reference in their entirety.

Engine 28 includes a crankshaft 32, which is attached to an input member 34 of centrifugal master friction clutch 30. Input member 34 frictionally engages with, and disengages from, an output member 36, which is attached to an input shaft 38 of transmission 22. A transmission output shaft 40 extends from the auxiliary transmission section 26 for driving connection to the vehicle drive wheels through a drive axle 41 or transfer case.

The terms "engaged" and "disengaged" as used in connection with a master friction clutch refer to the capacity, or lack of capacity, respectively, of the clutch to transfer a significant amount of torque. Mere random contact of the friction surfaces, in the absence of at least a minimal clamping force, is not considered engagement.

As may be seen from FIG. 1, centrifugal clutch 30 requires no external clutch actuator and is operated as a function of the rotational speed (ES) of the engine. Centrifugal clutch 30 also requires no connections to operating linkages, command signal inputs, power electronics and/or fluid power conduits. While the most economical application of the present invention is with a dry friction clutch, the present invention is also compatible with wet clutch technology.

A more detailed view of the structure of centrifugal clutch 30 may be seen by reference to FIGS. 3–6. As is known, rotation of input portion 34 will cause clutch 30 to engage and drivingly connect an engine output member, usually an engine flywheel or the like, to transmission input shaft 38.

The clamping force (CF) and torque transfer capacity of clutch 30 is a function of the rotational speed (ES) of engine 28 and clutch input member 34. Clutch 30 reaches incipient engagement at an engine speed (ES) greater than engine idle and fully engages at an engine speed lower than the engine speed at which a first upshift is required. Unlike normally closed master friction clutches that are normally engaged, clutch 20 is disengaged at lower engine speeds.

Figure 3:
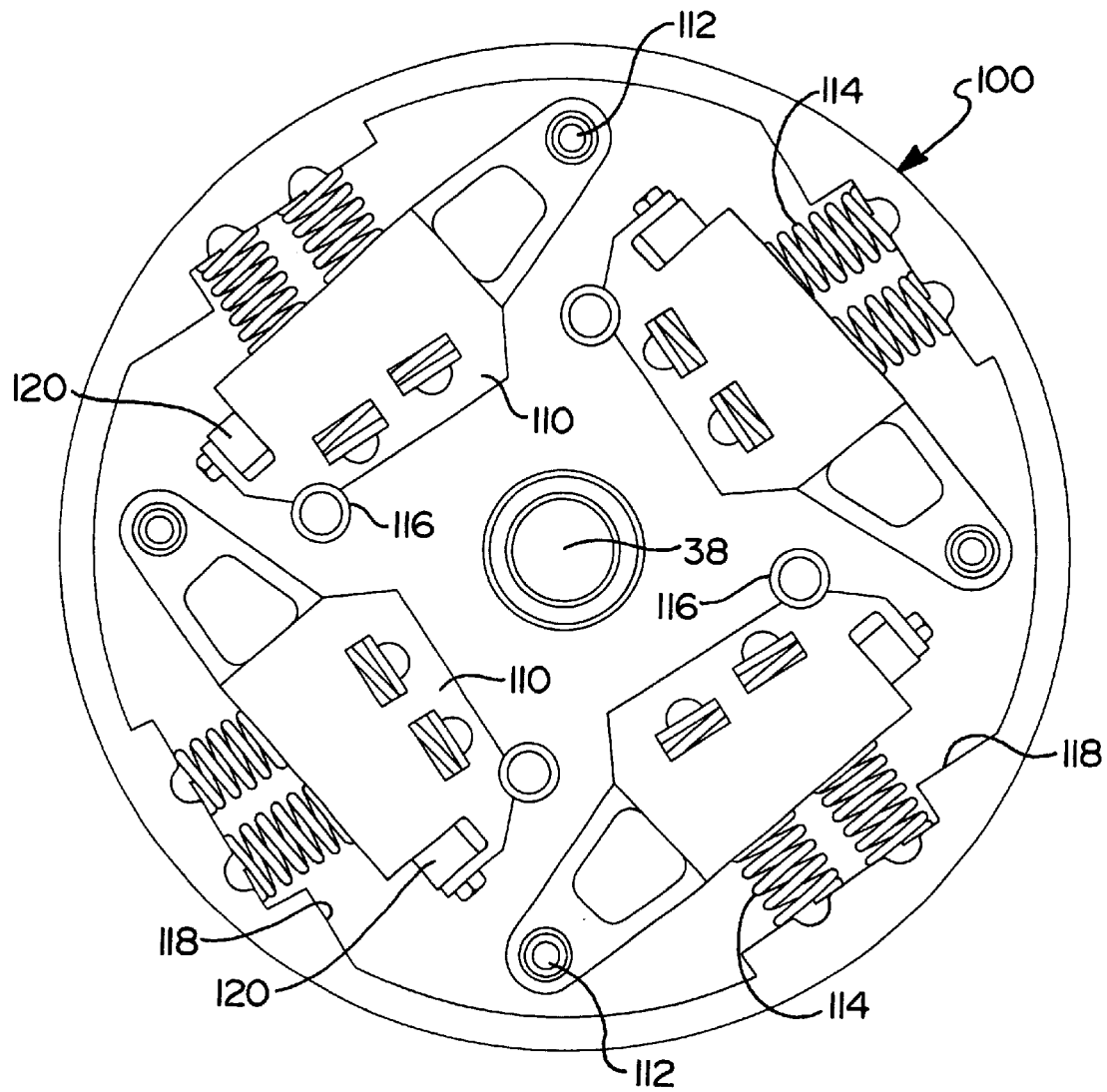
FIG. 3 is a partial cross-sectional view of the cover assembly and centrifugal components of the clutch according to the present invention.
Figure 5A:
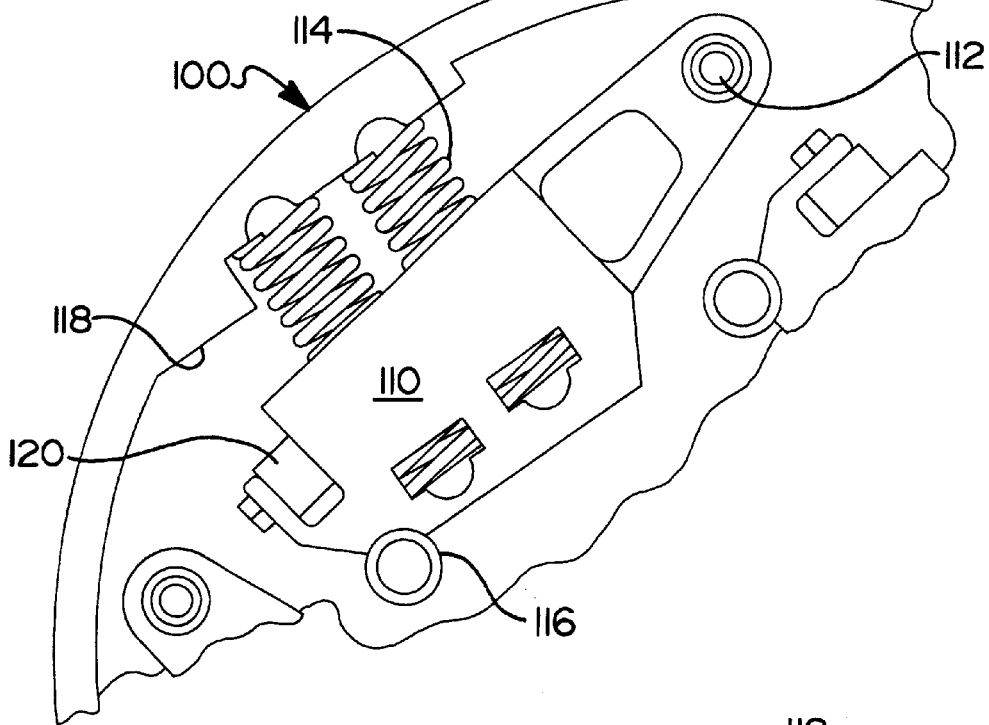
FIGS. 5A and 5B are partial sectional views illustrating the position of the flyweights in the disengaged position and the engaged position, respectively.
Figure 5B:
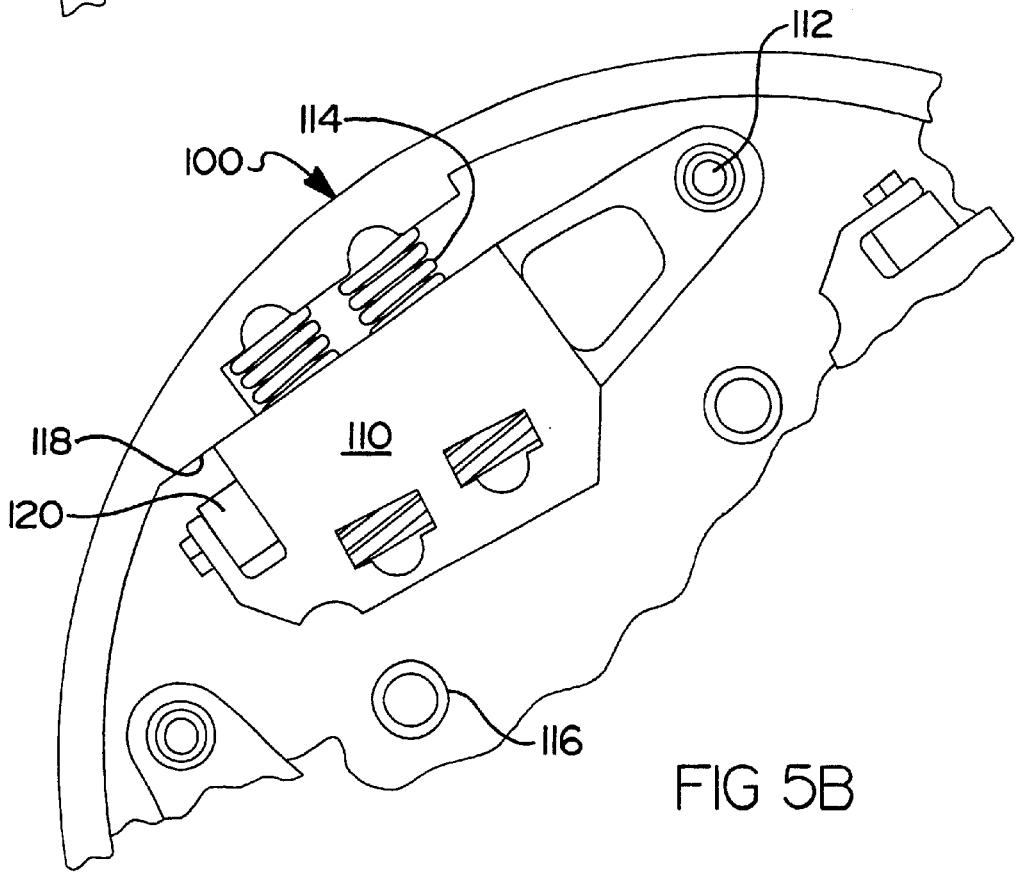
Figure 6:
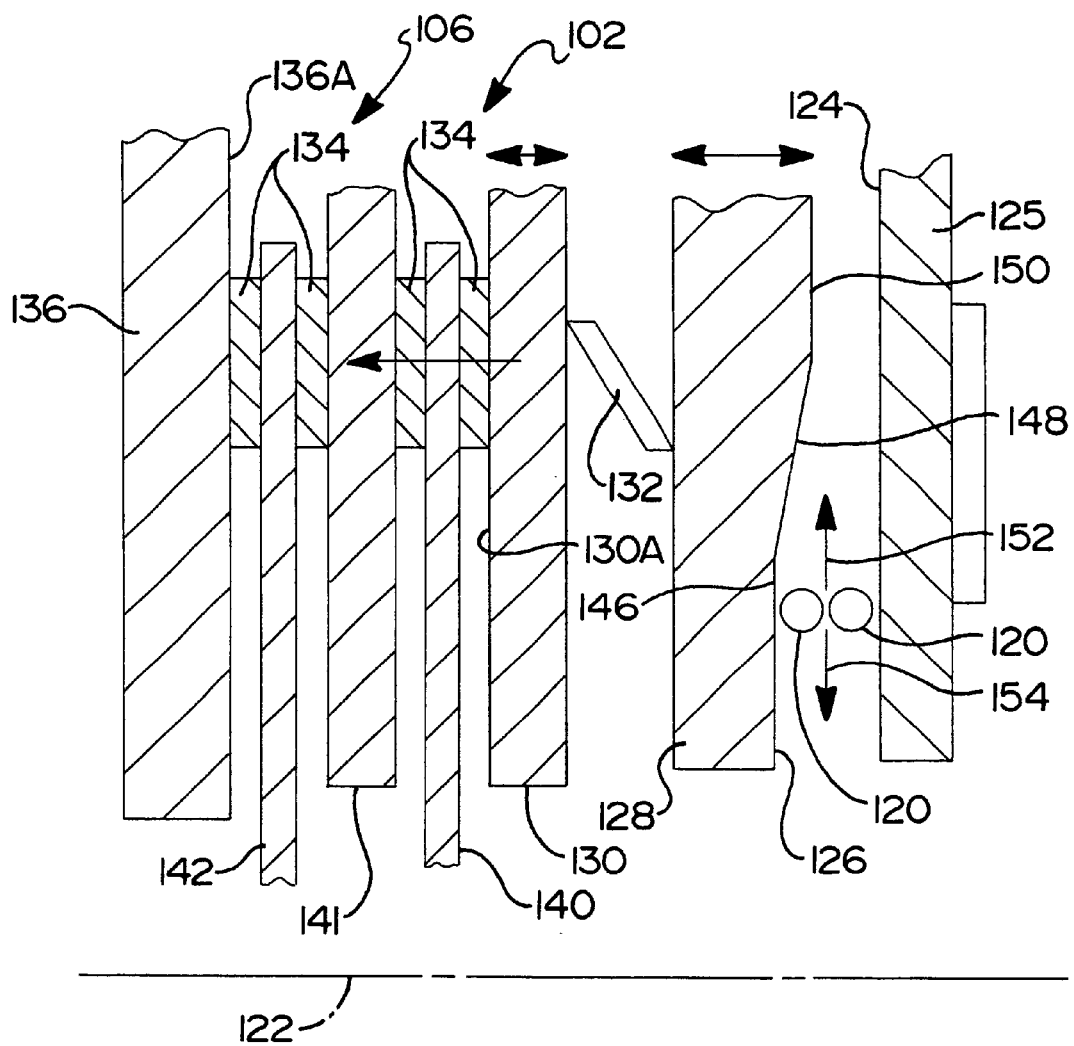
FIG. 6 is a schematic partial sectional view of the clutch according to the present invention.

Referring to FIGS. 3 and 6 of the drawings, clutch 30 includes a clutch cover assembly 100, a first friction plate 102, an intermediate pressure plate 141, and a second friction plate 106. Cover assembly 100, including main pressure plate 130 and intermediate pressure plate 141, mount to the engine flywheel 136 for rotation therewith and comprise the input portion 34 of clutch 30. Friction plates 102 and 106 are typically splined to transmission input shaft 38 and comprise the output portion 36 of clutch 30.

Referring to FIGS. 3-5B, cover assembly 100 includes four flyweights 110 that are pivotably mounted to cover assembly 100 at pivot pins 112. A plurality of return springs 114 bias the flyweights 110 radially inwardly to rest on stops 116 (see FIG. 5A). A surface 118 of cover assembly 100 limits the radially outward movement of flyweights 110 (see FIG. 5B). As engine 28 and cover assembly 100 rotate, the effect of centrifugal force will cause the flyweights 110 to move against the biasing force of springs 114 from the position of FIG. 5A to the position of FIG. 5B. Flyweights 110 each carry one or more rollers 120 or functionally similar wedging member, which act between a reaction surface and a ramp to provide an axial clamping force for engaging the master friction clutch 30.

FIG. 6 is a schematic illustration of the operational members shown in fragments as rotating about a rotational axis 122 of transmission input shaft 38. Rollers 120 of flyweights 110 are received between a substantially flat surface 124 of a fixed reaction plate 125 and a ramped surface 126 of an axially moveable ramp plate 128. The ramp plate 128 acts on an axially movable main pressure plate 130 through a preloaded spring member 132, such as a diaphragm spring, which limits the axial force applied to pressure plate 130 by ramp plate 128. Main pressure plate 130 will apply a clamping force (CF) on the friction pads 134 of friction plates 102, 106 which are trapped between surface 130A of the main pressure plate 130 and the intermediate pressure plate 141 and surface 136A of the engine flywheel 136. The hub portions 140 and 142 of the friction plates 102 and 106, respectively, are adapted to be splined to input shaft 38 for rotation therewith while plates 125, 128, 130, and 141 rotate with the engine flywheel 136.

Figure 2:
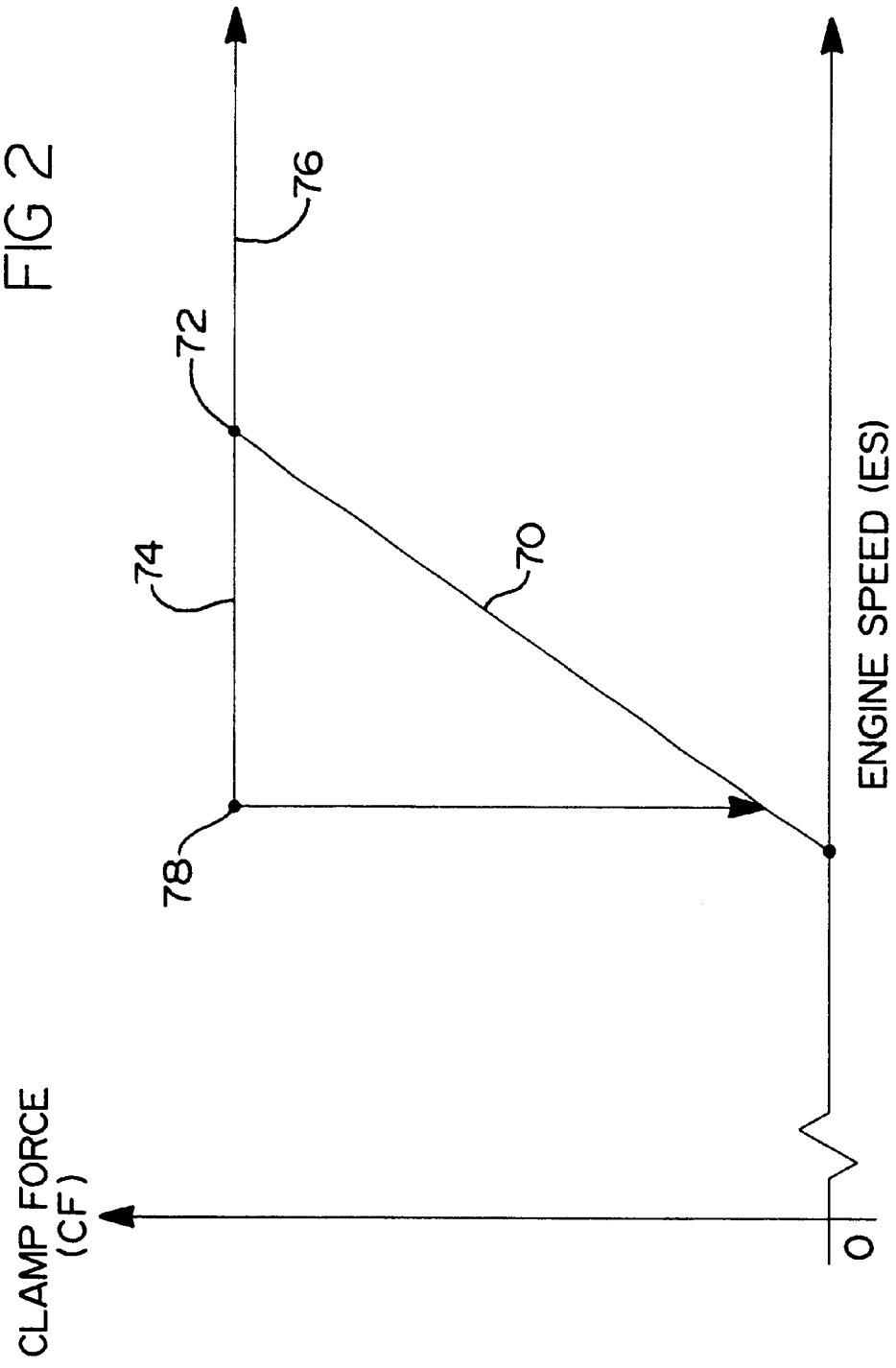
FIG. 2 is a schematic illustration, in graphical format, of the clamping force characteristics of the centrifugal clutch of the present invention at various engine speeds.

At rest, one of rollers 120 will engage the recessed portion 146 of surface 126 and will not apply a leftward acting axial clamping force (CF) to friction pads 134. As the roller 120 travels sufficiently radially outwardly and onto the ramped portion 148 of ramp surface 126, an increasing axial clamping force is applied (see line 70 of FIG. 2). As the roller moves further radially outwardly onto the flat extended portion of 150 of ramp surface 126, the clamp force (CF) will remain at a capped value (see lines 74 and 76 of FIG. 2) as limited by spring member 132.

A greater centrifugal force 152 is required to move rollers 120 up ramp portion 148 to flat portion 150 than is required to retain the rollers on flat portion 150 against the effect of a radially inward directed spring force 154 generated by return springs 114. This accounts for the difference between the engine speed (ES) value at the initial maximum clamp force, point 72 of FIG. 2, and the release engine speed value, point 78 of FIG. 2. The relative masses of flyweights 110 and/or the spring rate of spring 114 may be modified to change the engine speed value at disengagement (point 78 of FIG. 2).

Referring to FIGS. 7–10 of the drawings, a clutch installation device 200 according to a preferred embodiment of the present invention will be described in detail. Clutch installation device 200 comprises an installation cam 202 and a baffle member 204 positioned concentric with and radially outwardly of a temporary installation shaft 206, as shown installed within master friction clutch 30 in FIG. 7. To facilitate installation of clutch 30 into a vehicle drivetrain system, installation shaft 206 is utilized to align and hold friction plates 102, 106 in place until cover assembly 100 can be secured to flywheel 136. Once cover assembly 100 is secured to flywheel 136, installation shaft 206 may be removed without loss of axial alignment between friction plates 102, 106 and the flywheel 136.

Referring to FIGS. 8 and 9, installation cam 202 and baffle member 204 are shown in greater detail. As may be appreciated by those skilled in the art, installation cam 202 and baffle member 204 may be manufactured of any suitable material, such as, for example, gray iron, a composite material such as graphite-reinforced plastic, or steel. In a preferred embodiment, installation cam 202 is generally cylindrical having a duct 208 therethrough that extends from a first end 210 to a second end 212. A polygonal engagement feature 214 is included proximate first end 210 for engagement by a wrench to facilitate manual rotation of installation cam 202 during installation of clutch 30 in a vehicle drivetrain system. Second end 212 includes at least one cam surface 220 comprising an inclined ramp and a lug 222 that are both configured in size, shape and position to engage corresponding features on baffle member 204.

A cam portion 216 having a cam lobe 218 is position substantially between first end 210 and second end 212. Cam lobe 218 is configured in size and position to engage at least one flyweight 110 upon rotation of installation cam 202. As illustrated in FIG. 8, cam lobe 218 extends outwardly from cam portion 216 to a flat 221. The transition from cam portion 216 to cam lobe 218 is configured to minimize the load generated at the interface of cam lobe 218 and flyweight 110. Accordingly, a relatively low strength material, such as gray iron, may be employed in installation cam 202 without resulting in damage to cam lobe 218 and without sacrificing the requisite mechanical advantage needed to manually move flyweight 110.

Figure 7:
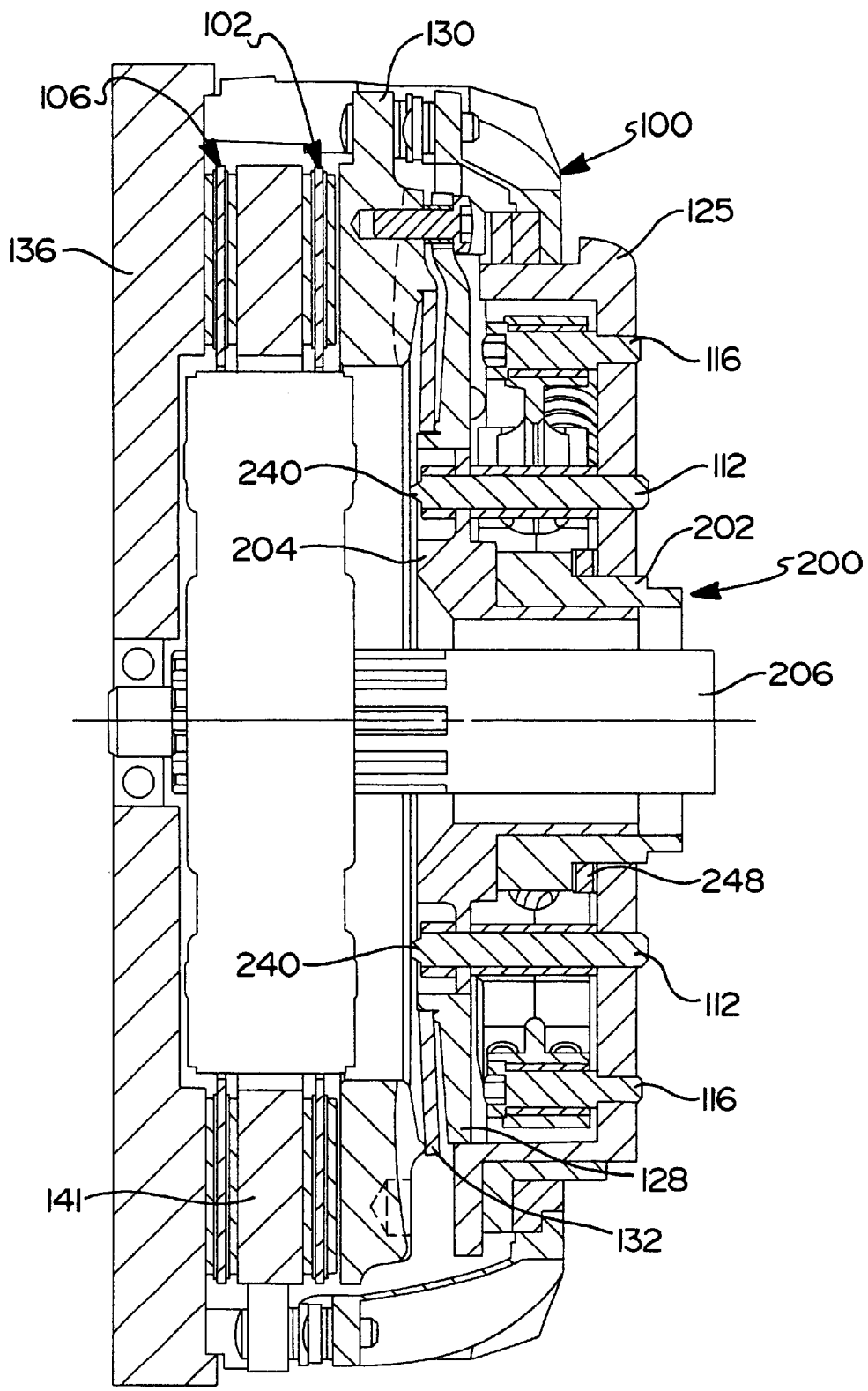
FIG. 7 is a partial cross-sectional view of the assembled clutch according to a preferred embodiment of the present invention.

In a preferred embodiment, baffle member 204 includes a generally cylindrical shaft-like structure 224 that provides a base for installation cam 202 to rotate and slide axially in relation thereto. A duct 226 extends through baffle member 204 from a first end 228 adjacent shaft-like structure 224 to a second end 230 adjacent an engagement portion 232 of baffle member 204. Engagement portion 232 is generally cylindrical having a plurality of apertures 234 therethrough for receiving pivot pin 112, or other fastening means, to secure baffle member 204 and flyweights 110 to cover assembly 100, as shown in FIG. 7. A plurality of indentations 238 may be included in second end 230 and positioned coaxial with apertures 234 to provide an area for receipt of a head 240 of each pivot pin 112. A generally cylindrical cam portion 242 extends axially away from engagement portion 232 and includes at least one cam surface 244 comprising an inclined ramp proximate at least one slot 246. Cam surface 244 and slot 246 are configured in size, shape and position to mate with cam surface 220 and lug 222, respectively, on installation cam 202, as will be described in further detail below.

As is known in the art of clutches, air is drawn, along with contamination, into the center of the clutch during operation, and is then forced radially outward toward the outside diameter of the clutch due to centrifugal force. In order to prevent contamination from flowing into the area surrounding flyweights 110, baffle member 204 is configured to channel airflow substantially between transmission input shaft 38 and baffle member 204 into the area surrounding friction plates 102 and 106, as shown in FIG. 7. Preventing air flow into the area surround flyweights 110 significantly reduces contamination build-up and promotes reliable operation of the centrifugal components of clutch 30.

Referring to FIGS. 10–14, a second embodiment of a clutch installation device 200' according to the present invention is shown in detail. In the second embodiment of the present invention, clutch installation device 200' comprises an installation cam 202' and a plate member 250 that are positioned concentric with and radially outwardly of a temporary installation shaft 206, as shown installed within a master friction clutch 30 in FIG. 10.

Referring to FIGS. 11A–12B, installation cam 202' and plate member 250 are shown in greater detail. As may be appreciated by those skilled in the art, installation cam 202' and plate member 250 may be manufactured of any suitable material, such as, for example, gray iron, a composite material such as graphite-reinforced plastic, or steel. As illustrated FIG. 11B, installation cam 202' is substantially similar to installation cam 202, as described in the preferred embodiment, with at least one exception, namely, installation cam 202' includes a plurality of tabs 252 instead of cam surface 220 and lug 222. Tabs 252 are preferably rectangular shaped and extend axially away from a cam lobe 218' in a direction toward a second end 212'. As will be described below, tabs 252 cooperate with plate member 250 to limit the degree of rotation of installation cam 202'. Installation cam 202' further includes a cylindrical land 254 positioned radially inward of tabs 252 that extends from cam lobe 218' to second end 212'. Once installed in clutch 30, land 254 abuts an inner surface 256 of plate member 250 and an inner surface 258 of reaction plate 128', as illustrated in FIG. 10.

Figures 12A, 12B:
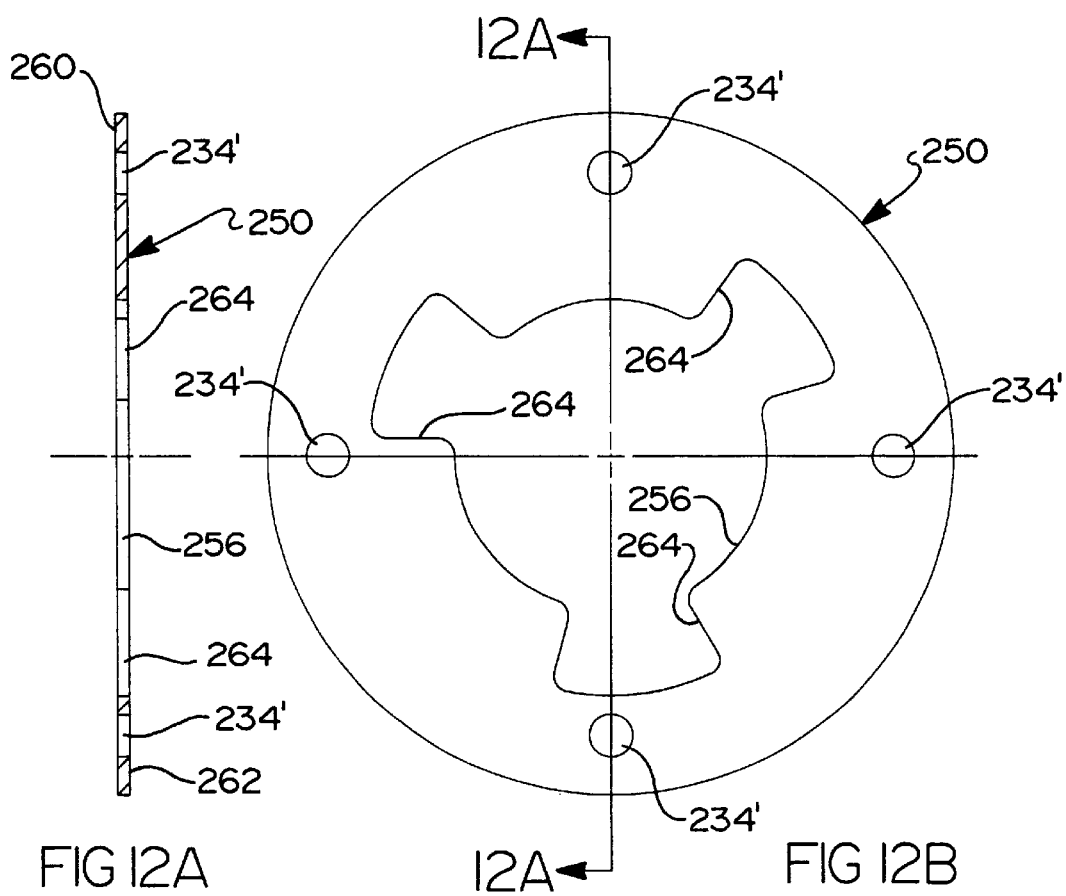
FIGS. 12A and 12B are a cross sectional view and elevational view, respectively, of a plate member according to the second embodiment.
Figure 13:
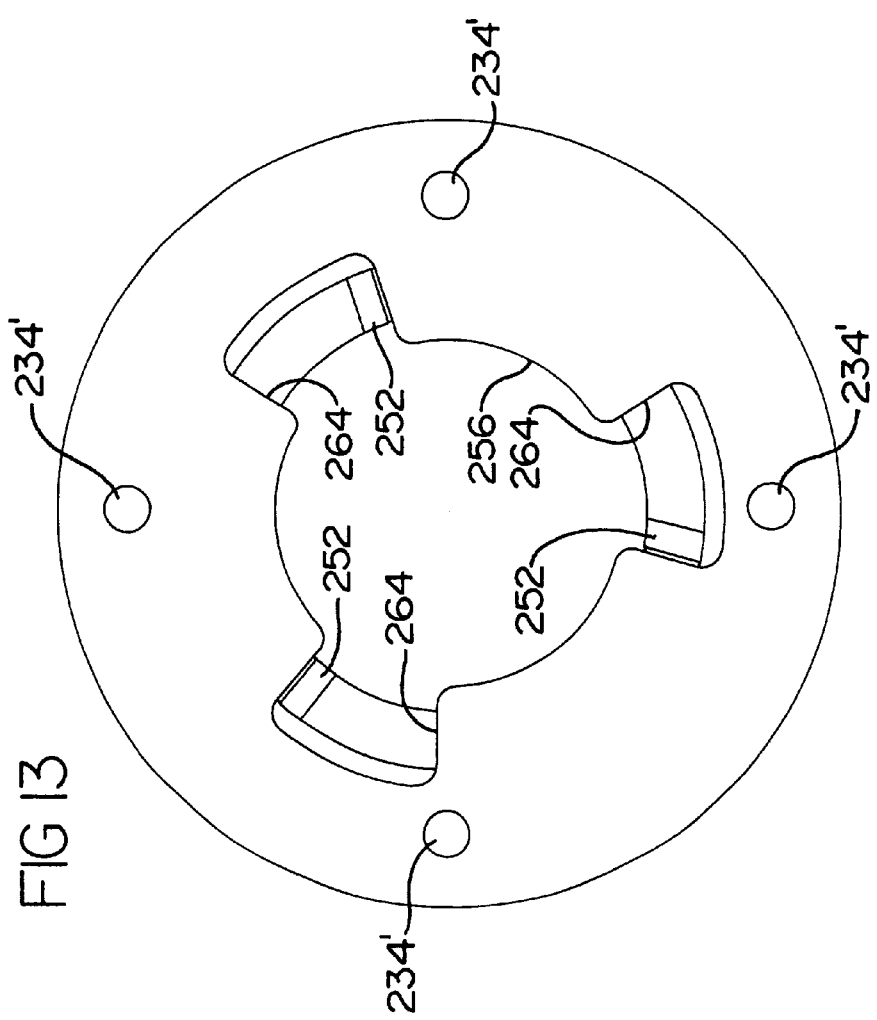
FIG. 13 is an elevational view of the installation cam relative to the plate member according to the second embodiment.

Referring to FIGS. 12A and 12B, plate member 250 comprises a thin circular plate having a first side 260 facing reaction plate 128' and a second side 262 abutting cam lobe 218' of installation cam 202'. Plate member 250 includes a plurality of apertures 234' therethrough for receiving pivot pin 112, or other fastening means, to secure plate member 250 and flyweights 110 to cover assembly 100, as shown in FIG. 10. Inner surface 256 of plate member 250 includes a plurality of radially outward projecting slots 264 that are configured in size and position to receive tabs 252 of installation cam 202', as shown in FIG. 13. As will be described in further detail below, slots 264 engage tabs 252 to limit the degree of rotation of installation cam 202'.

Figure 10:
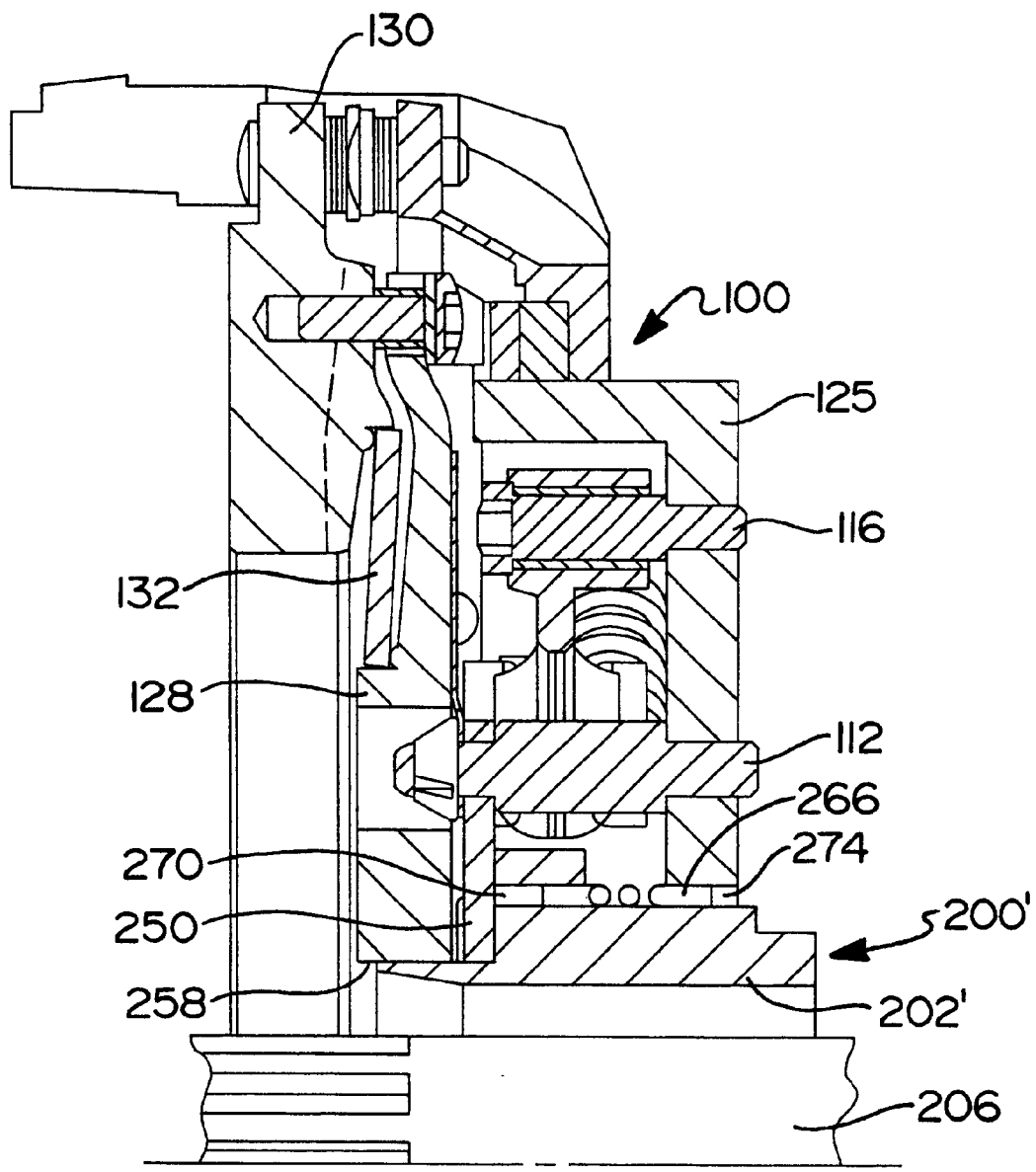
FIG. 10 is a partial cross-sectional view of the assembled clutch according to a second embodiment of the present invention.
Figure 14:
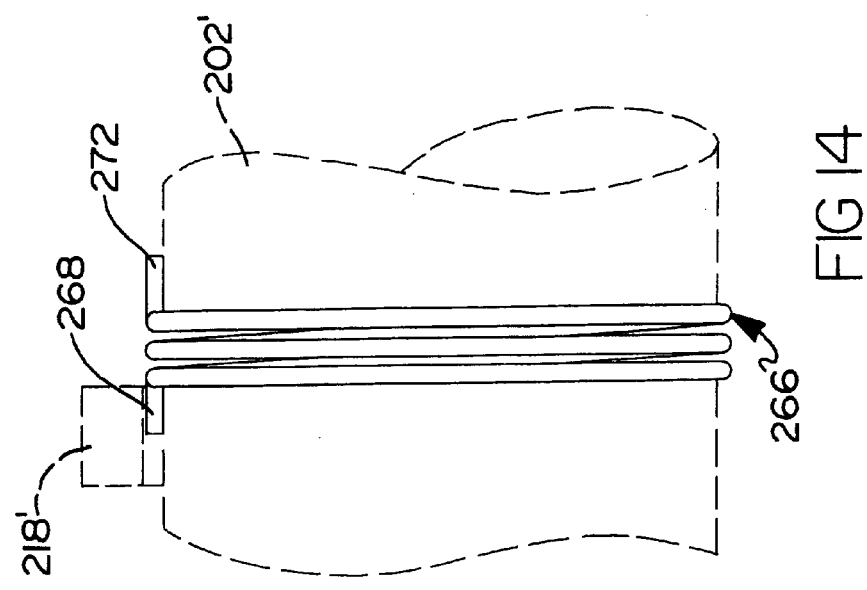
FIG. 14 is an elevational view of a resilient member according to the second embodiment.

Referring to FIGS. 10 and 14, a circumferentially acting resilient member 266, such as a torsion spring, is disposed between installation cam 202' and reaction plate 125. Resilient member 266 includes a first end 268 received in a first duct 270 in cam lobe 218' and a second end 272 received in a second duct 274 in reaction plate 125. Resilient member 266 provides a circumferentially acting biasing force against installation cam 202' to resist rotation of installation cam 202' in a clockwise direction.

Referring to FIGS. 15–18, a third embodiment of a clutch installation device 300 according to the present invention is shown in detail. In the second embodiment of the present invention, clutch installation device 300 comprises an installation cam 302 and a plate member 350 that are positioned concentric with and radially outwardly of a temporary installation shaft 206, as shown installed within a master friction clutch 30 in FIG. 15.

Figure 16C:
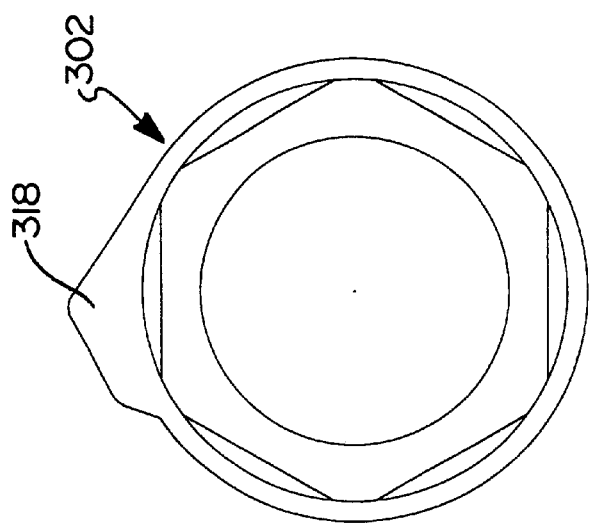
FIGS. 16A, 16B and 16C are an elevational view of a second end, a cross-sectional view, and an elevational view of a first end, respectively, of an installation cam according to the third embodiment.
Figure 16B:
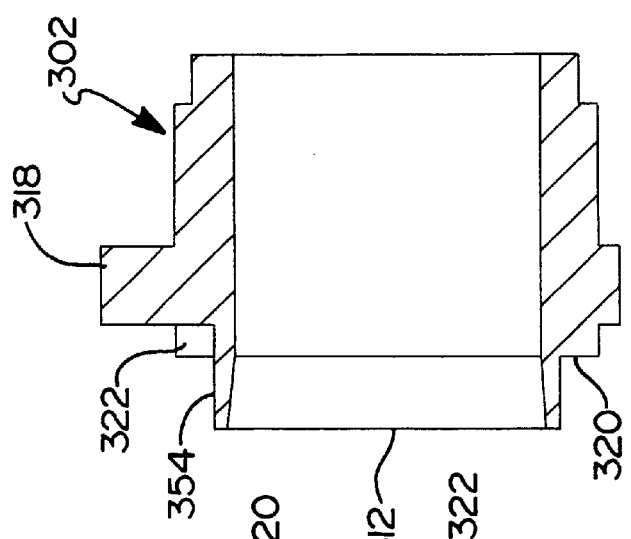
Figure 16A:
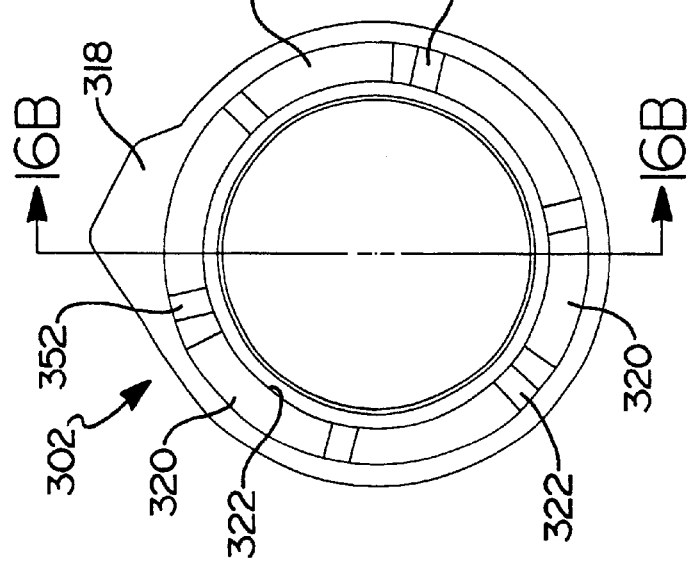

Referring to FIGS. 16A–17, installation cam 302 and plate member 350 are shown in greater detail. As may be appreciated by those skilled in the art, installation cam 302 and plate member 350 may be manufactured of any suitable material, such as, for example, gray iron, a composite material such as graphite-reinforced plastic, or steel. As illustrated in FIG. 16A, installation cam 302 is substantially similar to installation cam 202', as described in the second embodiment, with at least one exception, namely, installation cam 302 includes a plurality of cam surfaces 320 and lugs 322 instead of tabs 252. Cam surfaces 320 and lugs 322 are substantially similar to cam surface 220 and lug 222 in the preferred embodiment. Installation cam 302 further includes a cylindrical land 354 positioned radially inward of lugs 322 and extends from cam lobe 318 to second end 312. As will be described below, cam surfaces 320 and lugs 322 cooperate with plate member 350 to limit the degree of rotation of installation cam 302.

Figure 15:
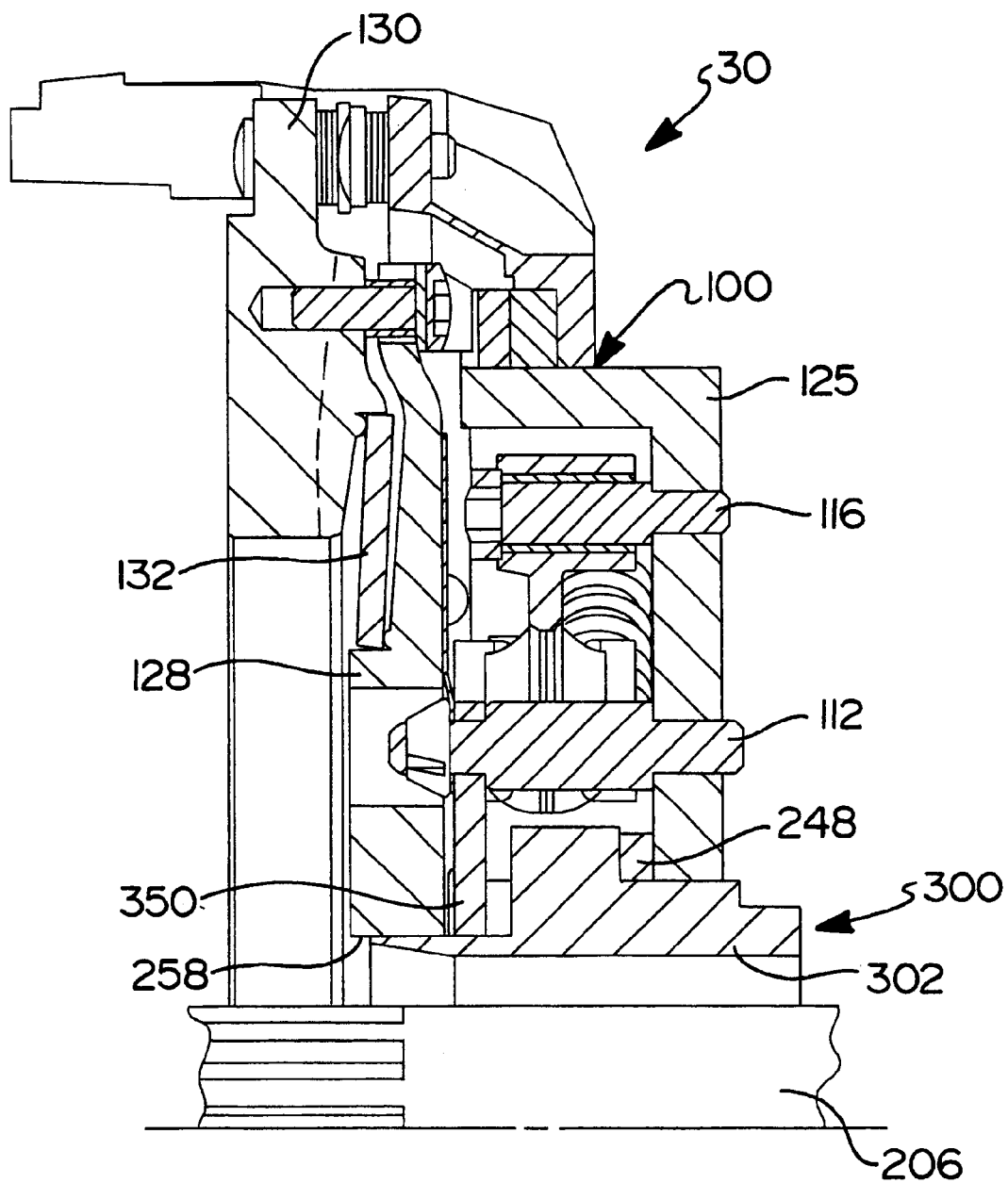
FIG. 15 is a partial cross-sectional view of the assembled clutch according to a third embodiment of the present invention.

Referring to FIGS. 17 and 18, plate member 350 comprises a thin circular plate having a first side 360 facing reaction plate 128' and a second side 362 facing cam lobe 318 of installation cam 302. Plate member 350 includes a plurality of apertures 334 therethrough for receiving pivot pin 112, or other fastening means, to secure plate member 350 and flyweights 110 to cover assembly 100, as shown in FIG. 15. An inner surface 356 of plate member 350 includes a plurality of radially inward projecting fingers 376 each having an integrally formed cam member 378 and a tab 380 extending therefrom in a direction away from second side 362. Each tab 380 is spaced apart from a cam member 378 on an adjacent finger 376 permitting lug 322 on installation cam 302 to be received therebetween. Cam members 376 are configured in size, shape and position to mate with cam surfaces 320 on installation cam 302, as will be described in further detail below.

Installation of a centrifugal master friction clutch 30 employing the inventive clutch installation device will be described with reference to FIGS. 7–19. The terms "clockwise" and "counterclockwise", as used herein, describe the rightward and leftward rotation, respectively, of installation cam 202 relative to baffle member 204, as illustrated in FIG. 9. As will be described in detail below, the procedure for installing centrifugal master fiction clutch 30 into a vehicle drive-train system generally comprises: (i) preparing cover assembly 100 for installation by "locking" the clutch installation device; (ii) positioning the friction plates 102, 106 adjacent the engine flywheel 136 using an installation shaft 206; (iii) securing cover assembly 100 to the engine flywheel 136; (iv) removing the installation shaft 206 after securing the cover assembly 100 to the engine flywheel 136; and (v) "unlocking" the clutch installation device to permit operation of clutch 30.

Cover assembly 100 is prepared for installation by rotating installation cam 202, 202', 302 in a clockwise direction from a position "A" to a position "C", as illustrated in FIG. 19. As installation cam 202, 202', 302 is rotated, cam lobe 218, 218', 318 contacts a flyweight 110 causing it to rotate outward against the biasing force of springs 114 (reference FIG. 19, positions "A"–"C"). As flyweight 110 is rotated outward, roller 120 travels up ramp 148 causing the reaction plate assembly (ramp plate 128, spring member 132, and pressure plate 130) to move in an axial direction toward engine 28. The distance the reaction plate assembly travels is substantially equal to the clutch engagement/ disengagement travel plus the deflection distance of spring member 132 required to cause a sufficient clamping force (CF) to prevent movement of friction plates 102, 106 after installation shaft 206 is removed from clutch 30. When installation cam 202, 202', 302 is rotated to position "C", as shown in FIG. 15, the biasing force of spring 114 press flyweight 110 against lobe 218, 218', 318 to "lock" or otherwise prevents further rotation of installation cam 202, 202', 302. In order to "unlock" installation cam 202, 202', 302, a sufficient torque must be applied to installation cam 202, 202', 302 in a counterclockwise direction and/or further outward rotation of flyweight 110 is required.

In the preferred embodiment, slot 246 in baffle member 204 and lug 222 in installation cam 202 cooperate to engagably limit the degree of clockwise rotation of installation cam 202 to ensure that lobe 218 is in the correct position (position "C" in FIG. 19) to provide the needed lift to flyweight 110. As installation cam 202 is rotated in a clockwise direction, cam surface 220 slides on cam surface 244 causing the rotative movement of installation cam 202 relative to baffle member 204 to be converted into axial movement. The axial movement of installation cam 202 compresses a resiliently compressible member 248, such as a diaphragm spring or the like, positioned between installation cam 202 and cover assembly 100, as shown in FIG. 7. Once installation cam 202 is rotated to the "locked" position (position "C" in FIG. 19), preparation of cover assembly 100 is complete enabling cover assembly 100 to be secured to engine flywheel 136.

In the second embodiment, tabs 252 rotate with installation cam 202' until tabs 252 engage a surface of slots 264 to engagably limit the degree of clockwise rotation of installation cam 202' to ensure that lobe 218' is in the correct position (position "C" in FIG. 15) to provide the needed lift to flyweight 110. As installation cam 202' is rotated in a clockwise direction, resilient member 266 is stressed such that a biasing force against installation cam 202' in a counterclockwise direction is generated. Once installation cam 202' is rotated to the "locked" position (position "C" in FIG. 15), preparation of cover assembly 100 is complete enabling cover assembly 100 to be secured to engine flywheel 136.

In the third embodiment, tabs 380 in plate member 350 and lugs 322 in installation cam 302 cooperate to engagably limit the degree of clockwise rotation of installation cam 302 to ensure that lobe 318 is in the correct position (position "C" in FIG. 19) to provide the needed lift to flyweight 110. As installation cam 302 is rotated in a clockwise direction, cam surfaces 320 slide on cam members 378 causing the rotative movement of installation cam 302 relative to plate member 350 to be converted into axial movement. The axial movement of installation cam 302 compresses a resiliently compressible member 248, such as a diaphragm spring or the like, positioned between installation cam 302 and cover assembly 100, as shown in FIG. 15. Once installation cam 302 is rotated to the "locked" position (position "C" in FIG. 19), preparation of cover assembly 100 is complete enabling cover assembly 100 to be secured to engine flywheel 136.

In preparation of securing cover assembly 100 to the engine flywheel 136, friction plates 102, 106 are positioned adjacent the engine flywheel 136 using installation shaft 206. Cover assembly 100 is then secured to flywheel 136 by a plurality of mounting bolts (not illustrated) as is generally known in the art. As the mounting bolts are tightened, cover assembly 100, and more particularly pressure plate 130, are drawn against the friction plates 102, 106 providing a clamping force (CF) through the compression of spring member 132. As described above, spring member 132 is compressed due to the position of ramp plate 128 caused by the outward rotation of the engaged flyweight 110. After fully tightening all of the mounting bolts, installation shaft 206 may be removed allowing the clamping force (CF) of cover assembly 100, and more particularly pressure plate 130, to hold friction plates 102, 106 in their correct alignment position for receipt of transmission input shaft 38.

After transmission 22 is installed and engine 18 is capable of being started, the clutch installation device may be "unlocked" permitting use of the vehicle. With transmission 22 in neutral, engine 18 is started and the engine speed (ES) is increased to a predetermined engine speed. The predetermined engine speed is based on factors, such as, for example, the biasing force of spring members 114 and the mass of flyweights 110. During the increase in engine speed (ES), flyweights 110 rotate outward due to centrifugal force, separating the "locked" flyweight 110 from cam lobes 218, 218' and 318 of installation cams 202, 202' and 302, respectively.

In the preferred embodiment, upon separation, the axial biasing force of resiliently compressible member 248 against installation cam 202 causes inclined cam surfaces 220 and 244 on installation cam 202 and baffle member 204, respectively, to slide against each other. As cam surfaces 220 and 244 slide against each other, the axial movement of installation cam 202 relative to baffle member 204 is converted into rotative movement causing installation cam 202 to rotate in a counterclockwise direction to an "unlocked" position "A", as shown in FIG. 19. After release of the "locked" flyweight 110, resiliently compressible member 248 continues to provide an axial force against installation cam 202 to maintain installation cam 202 in the "unlocked" position at the bottom of cam surfaces 220 and 244.

In the second embodiment, upon separation, the circumferentially acting biasing force of resilient member 266 causes installation cam 202' to rotate in a counterclockwise direction to the "unlocked" position "A", as shown in FIG. 19. After release of the "locked" flyweight 110, resilient member 266 continues to provide a circumferentially acting biasing force against installation cam 202' to maintain installation cam 202' in the "unlocked" position "A", as shown in FIG. 19.

In the third embodiment, upon separation, the axial biasing force of resiliently compressible member 248 against installation cam 302 causes inclined cam surfaces 320 and cam members 378 to slide against each other. As cam surfaces 320 and cam members 378 slide against each other, the axial movement of installation cam 302 relative to plate member 350 is converted into rotative movement causing installation cam 302 to rotate in a counterclockwise direction to an "unlocked" position "A", as shown in FIG. 19. After release of the "locked" flyweight 110, resiliently compressible member 248 continues to provide an axial force against installation cam 302 to maintain installation cam 302 in the "unlocked" position.

Among other advantages, the inventive clutch installation device simplifies installation of a normally open, centrifugal clutch system enabling a centrifugal clutch to be easily installed in a vehicle drive-train system. The inventive clutch installation device prevents movement of clutch friction plates 102, 106 during installation of a normally open, centrifugal master friction clutch 30 into a vehicle drive-train system 20. The inventive clutch installation device provides a means of easily "unlocking" the device after installation of the clutch 30 into the vehicular drive-train system 20. The inventive clutch installation device advantageously blocks the ingress of contamination into the area surrounding the centrifugal flyweights 110 to promote reliable operation of the centrifugal components of the clutch 30.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A centrifugal master friction clutch comprising an input portion fixed for rotation with an engine flywheel and an output portion fixed for rotation with a transmission input shaft, the output portion comprising at least one friction plate secured to the transmission input shaft for rotation therewith, the input portion comprising a cover assembly secured to the engine flywheel for rotation therewith, the cover assembly including a pressure plate for applying a clamping force against the friction plate, a plurality of flyweights that rotate outward under the effects of centrifugal force to cause the pressure plate to exert a clamping force against the friction plate, and a clutch installation device comprising:

a first member rotatably disposed in the cover assembly radially inward of the flyweights, a portion of the first member configured to selectively engage at least one of the flyweights to force the engaged flyweight to rotate outward;

a second member positioned adjacent the first member, the second member configured to engage the first member to limit the degree of rotation of the first member; and whereby when the engaged flyweight is rotated outward, the position of the pressure plate is modified such that, when the cover assembly is secured to the engine flywheel, the pressure plate provides a clamping force against the friction plate to prevent movement thereof.

2. The clutch according to claim 1, wherein the first and second members are positioned concentric with and radially outwardly of the transmission input shaft.

3. The clutch according to claim 1, wherein the second member includes a shaft-like structure and an engagement portion for securing the second member to the cover assembly.

4. The clutch according to claim 3, wherein the first member is slidably disposed on the shaft-like structure of the second member.

5. The clutch according to claim 1, wherein the first member includes a first cam surface and the second member includes a second cam surface, the first cam surface configured to engage the second cam surface to convert rotative movement of the first member relative to the second member into axial movement.

6. The clutch according to claim 5, wherein the first and second cam surfaces comprise an inclined ramp.

7. The clutch according to claim 5, wherein the first member includes at least one lug positioned proximate the first cam surface and the second member includes at least one slot proximate the second cam surface, the slot configured to receive the lug of the first member to limit the degree of rotation of the first member relative to the second member.

8. The clutch according to claim 1, wherein the first member includes a land and a plurality of cam surfaces disposed radially outward of the land.

9. The clutch according to claim 8, wherein the second member is a circular plate having a plurality of integrally formed cam members extending therefrom that are configured in size and position to engage the cam surfaces of the first member to convert rotative movement of the first member relative to the second member into axial movement.

10. The clutch according to claim 9, wherein the first member includes a lug positioned proximate each cam surface and the second member includes at tab positioned proximate each cam member, each tab configured to engage a corresponding lug on the first member to limit the degree of rotation of the first member relative to the second member.

11. The clutch according to claim 1 further including a resilient member disposed between the first member and the cover assembly.

12. The clutch according to claim 11, wherein the resilient member is a circumferentially acting torsion spring.

13. The clutch according to claim 11, wherein the resilient member is an axially compressible spring.

14. The clutch according to claim 13, wherein rotation of the first member relative to the second member causes said the first member to move in an axial direction away from the second member.

15. The clutch according to claim 14, wherein the axial movement of the first member relative to the second member in a direction away from the second member compresses the resiliently compressible member.

16. The clutch according to claim 1, wherein the first member includes a polygonal engagement feature to facilitate rotation of the first member relative to the second member.

17. A method of installing a centrifugal master friction clutch in a vehicle drive-train system, the centrifugal master friction clutch including an input portion fixed for rotation with an engine flywheel and an output portion fixed for rotation with a transmission input shaft, the output portion comprising at least one friction plate secured to the transmission input shaft for rotation therewith, the input portion comprising a cover assembly secured to the engine flywheel for rotation therewith, the cover assembly comprising a pressure plate for applying a clamping force against the friction plate, a plurality of flyweights that rotate outward under the effects of centrifugal force to cause the pressure plate to exert a clamping force against the friction plate, and a clutch installation device, the clutch installation device comprising a first member rotatably disposed in the cover assembly radially inward of the flyweights, a portion of the first member configured to selectively engage at least one of the flyweights to force the engaged flyweight to rotate outward and a second member for engagably limiting the degree of rotation of the first member, the method comprising the steps of:

(i) preparing the cover assembly for installation into the vehicle drive-train system by rotating the first member relative to the second member to a locked position;

(ii) positioning the friction plate adjacent the engine flywheel;

(iii) securing the cover assembly to the engine flywheel; and (iv) unlocking the clutch installation device to permit operation of the clutch.

18. The method according to claim 17, wherein the first member is rotated to a locked position by rotating the first member is in a clockwise direction relative to the second member.

19. The method according to claim 17, wherein the step of securing the cover assembly includes tightening a plurality of mounting bolts to draw the pressure plate against the friction plate.

20. A centrifugal master friction clutch comprising an input portion fixed for rotation with an engine flywheel and an output portion fixed for rotation with a transmission input shaft, the output portion comprising at least one friction plate secured to the transmission input shaft for rotation therewith, the input portion comprising a cover assembly secured to the engine flywheel for rotation therewith, the cover assembly including a pressure plate for applying a clamping force against the friction plate, a plurality of flyweights that rotate outward under the effects of centrifugal force to cause the pressure plate to exert a clamping force against the friction plate, and a clutch installation device comprising:

- a first member rotatably disposed in the cover assembly radially inward of the flyweights, the first member including at least one cam lobe and a plurality of tabs, said one can lobe configured to engage at least one of the flyweights;
- a second member comprising a circular plate having an inner surface that includes a plurality of radially outward projecting slots that are configured in size and position to receive the tabs of the first member to limit the degree of rotation of the first member relative to the second member;
- a resilient member disposed between the first member and the cover assembly; and
- whereby when the engaged flyweight is rotated outward, the position of the pressure plate is modified such that, when the cover assembly is secured to the engine flywheel, the pressure plate provides a clamping force against the friction plate to prevent movement thereof.

21. A centrifugal master friction clutch comprising an input portion fixed for rotation with an engine flywheel and an output portion fixed for rotation with a transmission input shaft, the output portion comprising at least one friction plate secured to the transmission input shaft for rotation therewith, the input portion comprising a cover assembly secured to the engine flywheel for rotation therewith, the cover assembly including a pressure plate for applying a clamping force against the friction plate, a plurality of flyweights that rotate outward under the effects of centrifugal force to cause the pressure plate to exert a clamping force against the friction plate, and a clutch installation device comprising:

- a first member rotatably disposed in the cover assembly radially inward of the flyweights, a portion of the first member configured to selectively engage at least one of the flyweights to force the engaged flyweight to rotate outward, wherein the portion of the first member configured to engage the flyweight comprises at least one cam lobe;
- a second member positioned adjacent the first member, the second member configured to engage the first member to limit the degree of rotation of the first member; and
- whereby when the engaged flyweight is rotated outward, the position of the pressure plate is modified such that, when the cover assembly is secured to the engine flywheel, the pressure plate provides a clamping force against the friction plate to prevent movement thereof.

22. The clutch according to claim 21, wherein the cam lobe extends outwardly from the first member to a flat.

23. A centrifugal master friction clutch comprising an input portion fixed for rotation with an engine flywheel and an output portion fixed for rotation with a transmission input shaft, the output portion comprising at least one friction plate secured to the transmission input shaft for rotation therewith, the input portion comprising a cover assembly secured to the engine flywheel for rotation therewith, the cover assembly including a pressure plate for applying a clamping force against the friction plate, a plurality of flyweights that rotate outward under the effects of centrifugal force to cause the pressure plate to exert a clamping force against the friction plate, and a clutch installation device comprising:

- a first member rotatably disposed in the cover assembly radially inward of the flyweights, a portion of the first member configured to selectively engage at least one of the flyweights to force the engaged flyweight to rotate outward, wherein the first member includes a land and a plurality of tabs disposed radially outward of the land;
- a second member positioned adjacent the first member, the second member configured to engage the first member to limit the degree of rotation of the first member; and
- whereby when the engaged flyweight is rotated outward, the position of the pressure plate is modified such that, when the cover assembly is secured to the engine flywheel, the pressure plate provides a clamping force against the friction plate to prevent movement thereof.

24. The clutch according to claim 23, wherein the second member is a circular plate having an inner surface that abuts the land of the first member, the inner surface including a plurality of radially outward projecting slots that are configured in size and position to receive the tabs of the first member to limit the degree of rotation of the first member relative to the second member.

25. A centrifugal master friction clutch comprising an input portion fixed for rotation with an engine flywheel and an output portion fixed for rotation with a transmission input shaft, the output portion comprising at least one friction plate secured to the transmission input shaft for rotation therewith, the input portion comprising a cover assembly secured to the engine flywheel for rotation therewith, the cover assembly including a pressure plate for applying a clamping force against the friction plate, a plurality of flyweights that rotate outward under the effects of centrifugal force to cause the pressure plate to exert a clamping force against the friction plate, and a clutch installation device comprising:

- a first member rotatably disposed in the cover assembly radially inward of the flyweights, a portion of the first member configured to selectively engage at least one of the flyweights to force the engaged flyweight to rotate outward;
- a second member positioned adjacent the first member, the second member configured to engage the first member to limit the degree of rotation of the first member;
- a resilient member disposed between the first member and the cover assembly, the resilient member comprising a circumferentially acting torsion spring that includes a first end received in a first duct in the first member and a second end received in a second duct in the cover assembly; and
- whereby when the engaged flyweight is rotated outward, the position of the pressure plate is modified such that, when the cover assembly is secured to the engine flywheel, the pressure plate provides a clamping force against the friction plate to prevent movement thereof.

26. A method of installing a centrifugal master friction clutch in a vehicle drive-train system, the centrifugal master friction clutch including an input portion fixed for rotation with an engine flywheel and an output portion fixed for rotation with a transmission input shaft, the output portion comprising at least one friction plate secured to the transmission input shaft for rotation therewith, the input portion comprising a cover assembly secured to the engine flywheel for rotation therewith, the cover assembly comprising a pressure plate for applying a clamping force against the friction plate, a plurality of flyweights that rotate outward under the effects of centrifugal force to cause the pressure plate to exert a clamping force against the friction plate, and a clutch installation device, the clutch installation device comprising a first member rotatably disposed in the assembly radially inward of the flyweights, a portion of the first member configured to selectively engage at one of the flyweights to force the engaged flyweight to rotate outward and a second member for engagably limiting the degree of rotation of the first member, the method comprising the steps of:

(i) preparing the cover assembly for installation into the vehicle drive-train system by rotating the first member relative to the second member to a locked position;

(ii) positioning the friction plate adjacent the engine flywheel using an installation shaft;

(iii) securing the cover assembly to the engine flywheel;

(iv) removing the installation shaft after securing the cover assembly to the engine flywheel; and (v) unlocking the clutch installation device to permit operation of the clutch, wherein the step of unlocking the installation device comprises placing the transmission in neutral and increasing the engine speed to a predetermined speed.

27. The method according to claim 26, wherein the predetermined engine speed is the speed at which the engaged flyweight separates from the first member and rotates outwardly under the effect of centrifugal force.

28. The method according to claim 26, wherein the predetermined engine speed is a function of the flyweight mass.

* * * * *